United States Patent [19]

Hendrix et al.

[11] Patent Number: 4,986,941
[45] Date of Patent: Jan. 22, 1991

[54] SHOTTING APPARATUS AND PROCESS

[75] Inventors: Loren E. Hendrix, Webster; Alan B. Mistrater, Fairport, both of N.Y.

[73] Assignee: Xerox Corporation, Stamford, Conn.

[21] Appl. No.: 548,460

[22] Filed: Jul. 2, 1990

[51] Int. Cl.[5] ............................................... B29B 9/10
[52] U.S. Cl. ........................................ 264/13; 75/340; 425/6
[58] Field of Search .................... 264/13, 14, 9; 425/6, 425/10; 75/340, 341; 65/21.2, 142

[56] References Cited

U.S. PATENT DOCUMENTS

| | | | |
|---|---|---|---|
| 259,120 | 6/1882 | Farrell | 425/6 |
| 1,951,790 | 3/1934 | Curran | 264/13 |
| 2,113,280 | 4/1938 | Olin et al. | 75/341 |
| 2,268,888 | 3/1939 | Mericola | 264/13 |
| 2,287,029 | 6/1942 | Dowdell | 75/340 |
| 2,510,574 | 6/1947 | Greenhalgh | 264/9 |
| 2,574,357 | 11/1951 | Stammer et al. | 425/6 |
| 2,931,067 | 4/1960 | Delaloye et al. | 264/14 |
| 2,968,833 | 1/1961 | DeHaven et al. | 264/9 |
| 3,274,642 | 9/1966 | Cramer | 425/6 |
| 3,817,502 | 6/1974 | Taylor | 264/9 |
| 4,097,267 | 6/1978 | Baccaro et al. | 75/340 |
| 4,108,927 | 8/1978 | Francis et al. | 264/13 |
| 4,414,179 | 11/1983 | Rabinette | 420/579 |
| 4,702,765 | 10/1987 | Sato et al. | 75/340 |
| 4,822,712 | 4/1989 | Foley et al. | 430/128 |
| 4,842,973 | 6/1989 | Badesha et al. | 430/128 |
| 4,859,411 | 8/1989 | Sweatman et al. | 419/23 |
| 4,894,307 | 1/1990 | Badesha et al. | 430/128 |

*Primary Examiner*—Mary Lynn Theisen
*Attorney, Agent, or Firm*—Judith L. Byorick

[57] ABSTRACT

Disclosed is a shotting apparatus which comprises a chamber for containing a molten material and a plate with a plurality of orifices through which the molten material can pass to form droplets, wherein the molten material in the chamber first contacts the top surface of the plate and wherein the bottom surface of the plate contains protrusions through which the orifices extend, the length of each protrusion being at least 50 percent of the total length of the orifice passing through the protrusion, wherein the apparatus is of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent weight, and silicon in an amount of from 0 to about 1 percent by weight. Also disclosed is a process which comprises providing the above shotting apparatus, introducing a molten material into the shotting apparatus, allowing the molten material to pass through the orifices to form droplets, and cooling the droplets thus formed to a temperature at which the droplets are solid.

18 Claims, 3 Drawing Sheets

SHOTTING APPARATUS AND PROCESS

BACKGROUND OF THE INVENTION

The present invention is directed to an apparatus and process for preparing solid beads or shots from a liquid material. More specifically, the present invention is directed to an apparatus for forming solid beads or shots from liquid, such as a metal alloy, which comprises a chamber for containing a molten material and a plate with a plurality of orifices through which the molten material can pass to form droplet, wherein the molten material in the chamber first contacts the top surface of the plate and wherein bottom surface of the plate contains protrusions through which the orifices extend, the length of each protrusion being at least 50 percent of the total length of the orifice passing through the protrusion, wherein the apparatus is of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to about 1 percent by weight. The present invention is also directed to a process for making shots with the apparatus of the present invention.

Processes for preparing solid shots or beads from liquids such as metal alloys are known. Generally, the process comprises pouring the liquid into a dropping pan or shotter at the top of a high shot tower. The bottom of the dropping pan or shotter is perforated and the molten material passes through the perforations and separates from the pan as discrete particles or drops that assume spherical shape, solidify, and fall into water. U.S. Pat. No. 259,120 (Farrell) discloses a kettle for making drop shot. The kettle, preferably of iron, has perforations through its bottom which are countersunk or conically enlarged on the inner or top surface of the kettle bottom to retard the flow of molten material to the perforations. In addition, U.S. Pat. No. 2,287,029 (Dowdell) discloses a method for making lead alloy shot which comprises supplying a molten alloy of 0.5 to 10 percent magnesium and 90 to 99.5 percent lead to the upper surface of a perforated plate for dropping therethrough in an atmosphere of hydrocarbon gas free of water vapor and oxygen. Further, U.S. Pat. No. 2,510,574 (Greenhalgh) discloses a process for forming spherical pellets from a material in the liquid state which comprises the steps of flowing a continuous stream of the liquid material through an aperture, applying to the stream vibration of a frequency determined by the ratio of the velocity of the continuous stream to a divisor of 3.25 to 5.75 times the diameter of the continuous stream to insure separation of the stream into discrete flobules of uniform size, and maintaining the globules separated until they have solidified. Additionally, U.S. Pat. No. 2,268,888 (Mericola) discloses a method and apparatus for forming fused molten chemical materials into solidified droplets or pellets. The process comprises circulating the molten material into, through, and out of a drop forming chamber, withdrawing a lesser portion of the material then that circulated in the form of droplets from the chamber and dropping them on a cooling surface to form solidified pellets, and controlling the temperature and fluidity of that portion of the material instantaneously in the chamber by varying the rate of circulation. The apparatus comprises a chamber for the reception of a body of material and a plurality of tubes extending through the bottom of the chamber, the lower ends of the tubes being externally cone shaped and the upper ends being disposed at an angle to the horizontal.

U.S. Pat. No. 3,274,642 (Cramer) discloses an apparatus for forming solid spherical granules from molten liquid ammonium nitrate. The apparatus comprises a tower equipped at its top with a plurality of stationary quiescent liquid reservoirs, an orifice plate forming the bottom of each of the reservoirs and through which may freely fall streams of liquid ammounium mitrate, a sound producing system, a sound chamber communication with and depending from the lower portion of the plate, means for communicating the sound producing system and the sound chamber, means for impinging sonic vibrations upon the streams, and means for passing upwardly in countercurrent to the streams blasts of cooling gas. In addition, U.S. Pat. No. 1,951,790 (Curran) discloses a method and apparatus for treating asphalt which comprises a receiver, a tubular shell open at the bottom, means for supporting the shell in a substantially vertical position directly above and in spaced relation to the receiver, an annular chamber enclosing the side walls of the shell, means for circulating fluid through the chamber, and means for introducing liquid in a plurality of streams into the upper portion of the shell.

Shotting processes to form beads or shots of seleunim alloys are also known, as disclosed in, for example, U.S. Pat. No. 4,414,179. Shots or beads of selenium alloy are frequently employed in vacuum evaporation processes to prepare electrophotographic imaging members or photoreceptors, as disclosed in, for example, U.S. Pat. No. 4,894,307, U.S. Pat. No. 4,859,411, U.S. Pat. No. 4,842,973, and U.S. Pat. No. 4,822,712, the disclosures of each of which are totally incorporated herein by reference. Typically, since molten selenium is highly reactive, the molten selenium alloy is passed through a shotter of quartz to minimize contamination of the selenium alloy by reaction products of the selenium alloy and the shotter material. Known quartz shotters, however, exhibit several disadvantages. For example, quartz is a fragile material readily subject to breakage. In addition, quartz, while being far less reactive with selenium and selenium alloys then materials typically employed to make shotters, such as stainless steel, can still contaminate selenium alloy passing through a quartz shotter. Quartz contaminants in selenium alloy shots can result in surface defects on photoreceptors prepared by vacuum evaporation of the alloy shots, since the quartz will also be deposited onto the photoreceptor. Further, known shotters employed to prepare beads or shots of selenium or selenium alloys generally must be removed from the system and cleaned after about 0.5 to 6 hours, since operation after that period of time results in formation of beads or shots larger than the desired size.

Accordingly, while known shotting apparatuses and processes are suitable for the intended purposes, a need remains for improved apparatuses and processes for preparing shots or beads from molten materials. In addition,there is a need for improved shotting apparatuses and processes which enable formation of beads or shots of uniform size for long periods of time without the need for cleaning of the shotter. Further, a need exists for improved shotting apparatuses and processes suitable for preparing shots or beads of selenium or selenium alloys. A need also exists for improved shotting apparatuses and processes that form selenium or selenium alloy beads or shots which result in little or no surface defects when the shots or beads are vacuum evaporated to form an electrophotographic photoreceptor.

SUMMARY OF THE INVENTION

It is an object of the present invention to provide improved apparatuses and processes for preparing shots or beads from molten materials.

It is another object of the present invention to provide improved shotting apparatuses and processes which enable formation of beads or shots of uniform size for long periods of time without need for cleaning of the shotter.

It is yet another object of the present invention to provide improved shotting apparatuses and processes suitable for preparing shots or beads of selenium or selenium alloys.

It is still another object of the present invention to provide improved shotting apparatuses and processes that form selenium or selenium alloy beads or shots which result in little or no surface defects when the shots or beads are vacuum evaporated to form an electrophotographic photoreceptor.

These and other objects of the present invention are achieved by providing a shotting apparatus which comprises a chamber for containing a molten material and a plate with a plurality of orifices through which the molten material can pass to form droplets, wherein the molten material in the chamber first contacts the top surface of the plate and wherein the bottom surface of the plate contains protrusions through which the orifices extend, the length of each protrusion being at least 50 percent of the total length of the orifice passing through the protrusion, wherein the apparatus is of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 about 1 percent by weight, and silicon in an amount of from 0 to about 1 percent by weight. Another embodiment of the present invention is directed to a shotting process which comprises providing a shotting apparatus of the present invention, introducing a molten material into the shotting apparatus, allowing the molten material to pass through the orifices to form droplets, and cooling the droplets thus formed to a temperature at which the droplets are solid. In a particularly preferred embodiment, the material from which shots are formed is selenium or an alloy of selenium.

DETAILED DESCRIPTION OF THE INVENTION

Figure 1:
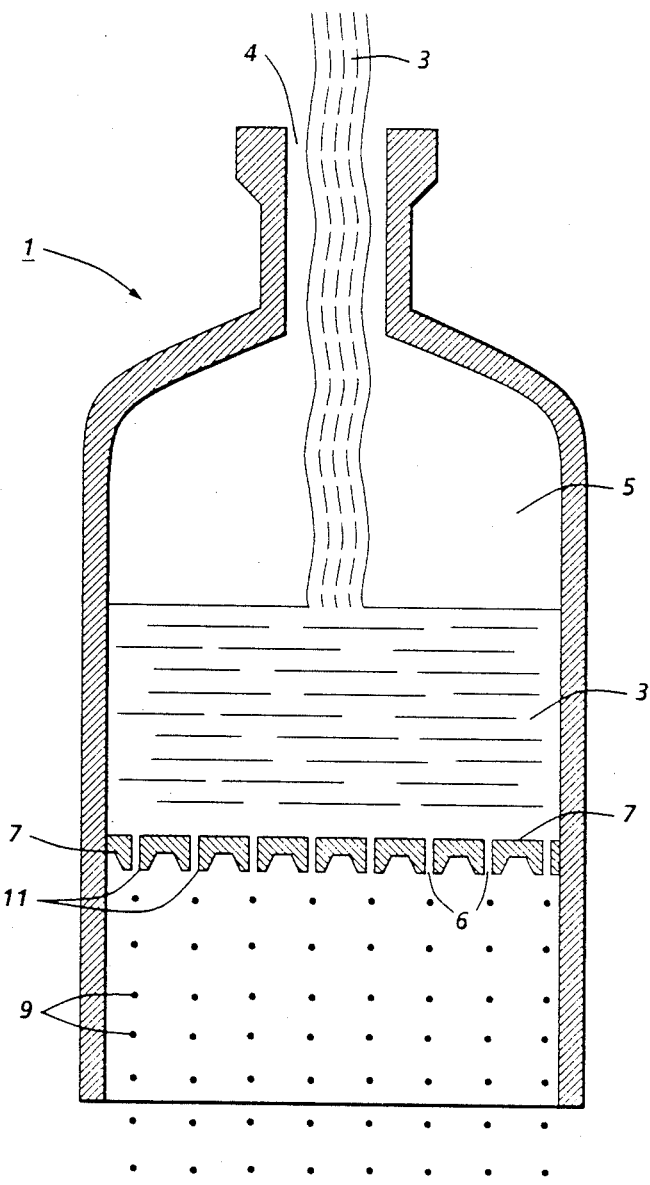
FIGS. 1 illustrates schematically in cross-section an example of a shotting apparatus of the present invention.
Figure 2A:
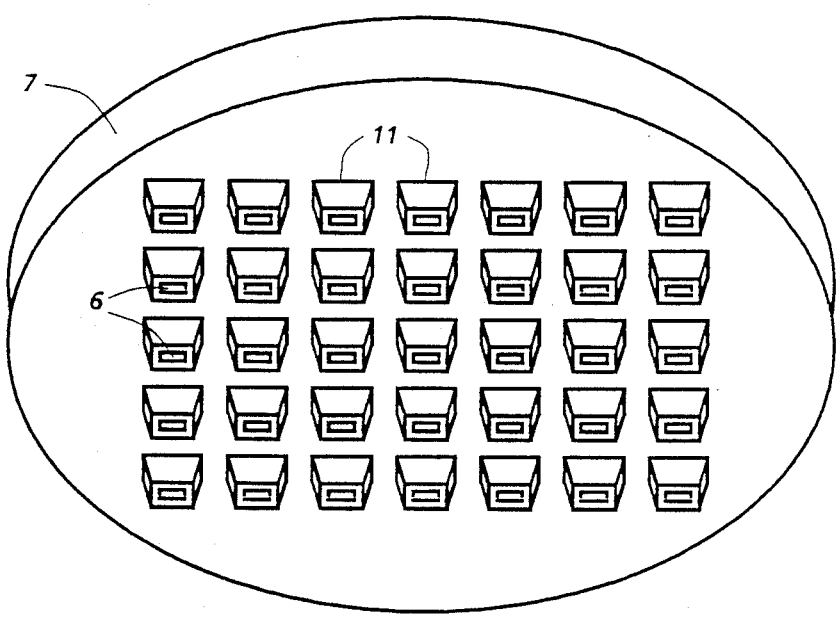
FIGS. 2a and 2b illustrate schematically bottom views of the plate of the shotting apparatus of the present invention illustrating examples of possible protrusion configurations for the plate.
Figure 3:
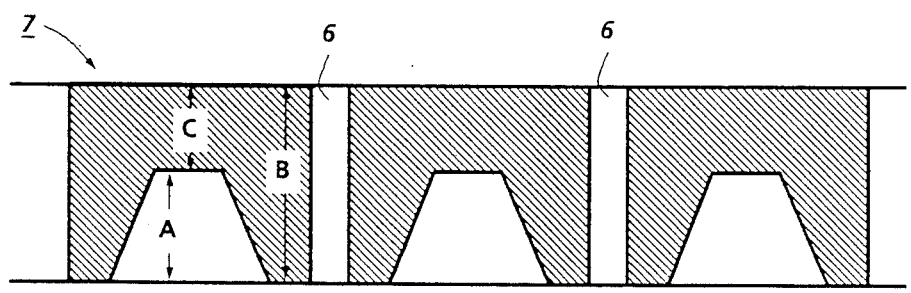
FIG. 3 illustrates schematically in cross-section a view of the plate of the shotting apparatus of the present invention.
Figure 2B:
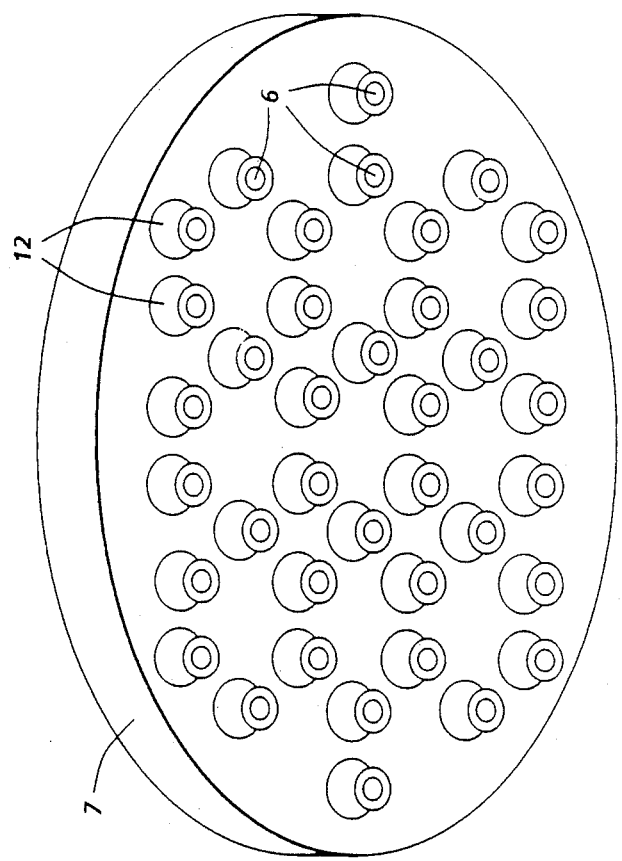

Illustrated schematically in FIG. 1 is an example of a shotting apparatus of the present invention. As shown, shotting apparatus 1 receives a supply of molten material 3 at inlet 4 into chamber 5. The molten material 3 in chamber 5 passes through the orifices 6 in plate 7, thereby forming droplets 9 of the molten material. Droplets 9 subsequently drop into a receiving container (not shown), which generally is filled with a coolant such as water maintained at a temperature sufficient to cool the droplets to a temperature below their melting point upon contact with the coolant. Plate 7 has orifices 6 through which the molten material passes. Although orifices 6 are shown in the drawings as cylindrical or circular in cross-section, the orifices need not be of this shape. On the surface of plate 7 from which the droplets fall (opposite to the surface first contacted by the molten material), protrusions 11 are situated around each orifice. The protrusions 11 can be of any desired shape, such as tapered square (as illustrated in FIG. 2a), untapered square, conical (as illustrated in FIG. 2b), cylindrical, or any other regular or irregular shape. The protrusions 11 do not contact each other and are of sufficient length to prevent molten material 3 from flowing along the bottom of plate 7 from one orifice to another. Preferably, as illustrated in FIG. 3, the length of the protrusions 11 is such that the protrusion 11 constitutes at least half of the length of the entire orifice 6, so that the protrusion 11 is at least as thick or thicker than the flat portion of the plate. Thus, as illustrated in FIG. 3, distance A is at least half of distance B, and distance A is equal to or greater than distance C. The orifices 6 can be any desired distance apart provided that the protrusions 11 surrounding the orifices 6 are physically separated from each other and molten material passing through orifices 6 cannot travel along the bottom of plate 7 from one orifice to an adjacent orifice. In addition, the orifices can be in any desired configuration with respect to each other, such as a square grid pattern (as shown in FIG. 2a), a hexagonal pattern (as shown in FIG. 2b), or any other regular or irregular pattern. While the apparatus as illustrated in the figures is essentially cylindrical in shape, the shotter need not be limited to this configuration, and any geometrical shape can be employed for the apparatus.

The entire shotting apparatus is formulated of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to about 1 percent by weight.

When the shotting apparatus is prepared from silicon carbide, any suitable silicon carbide material that is not susceptible to corrosion by the molten material to be shotted can be employed. Particularly preferred is Hexoloy ™ SA, available from Carborundum Company, which is a pressureless sintered alpha crystal, single phase silicon carbide (containing essentially no free silicon) with excellent resistance to chemical attack in both reducing and oxidizing environments. Also particularly preferred is Crystar ™, available from Norton Industrial Ceramics Division, Worcester, MA, a 99 percent pure recrystallized silicon carbide. Silicon carbide exhibits particular advantages for shotting apparatuses of the present invention, such as high heat transfer and excellent corrosion resistance.

Shotters of the present invention and formulated from silicon carbide can be prepared by any suitable process. For example, the shotting apparatus can be prepared by compression or dry press cold molding silicon carbide particles, preferably with submicron diameters, in a mold equipped with appropriately shaped tool cavities and die punches to form a shotter of the desired size and shape. Subsequently, the molded silicon carbide is sintered by heating it under pressure in the mold to a temperature sufficient to cause the powdered silicon carbide to fuse into a solid; typically the sintering temperature is at or below the melting temperature of silicon carbide, and typically is from about 1,800° C. to about 2,000° C., although temperatures outside of this range can be used. In addition, the shotting apparatus can be prepared by preparing the body of the shotter and the shotting plate separately by any suitable process, such as compression or dry press cold molding, injection molding, or the like, followed by fitting the plate into the body of the shotter and securing it by any suitable means, such as screws, protrusions in the body of the apparatus designed to fit with the plate in the desired position, or the like. Any other suitable process for preparing a silicon carbide shotter can also be employed.

When the shotting apparatus is prepared from a metal alloy, the alloy comprises nickel in an amount of from about 50 to about 70 percent by weight, preferably from about 55 to about 66 percent by weight, more preferably from about 57 to about 64 percent by weight, and most preferably from about 57 to about 59 percent by weight; molybdenum in an amount of from about 11 to about 22 percent by weight, preferably from about 14 to about 18 percent by weight, more preferably from about 15 to about 17 percent by weight, and most perferably about 16 percent by weight; chromium in an amount of from about 11 to about 22 percent by weight, preferably from about 14 to about 18 percent by weight, more preferably from about 15 to about 17 percent by weight, and most perferably about 16 percent by weight; iron in an amount of from 0 to about 10 percent by weight, preferably from 0 to about 7 percent by weight, more preferably from 0 to about 6 lpercent by weight, and most preferably from 0 to about 5 percent by weight; tungsten in an amount of from 0 to about 10 percent by weight, preferably from 0 to about 7 percent by weight, more preferably from 0 to about 5 percent by weight, and most preferably about 4 percent by weight; manganese in an amount of from 0 to about 1 percent by weight; and silicon in an amount of from 0 to about 1 percent by weight. The alloy is of a composition that is resistant to corrosion when contacted with molten selenium or alloys of selenium. One particulary preferred alloy in Hastelloy alloy C (available from Haynes-Stellite Company, division of Union Carbide Corporation), which contains about 57 to 59 percent by weight nickel, about 16 percent by weight molybdenum, about 16 percent by weight chromium, about 5 percent by weight iron, about 4 percent by weight tungsten, and trace amounts of manganese and silicon. Alloys of the composition described herein exhibit particular advantages for shotting apparatuses of the present invention, such as reduced cost and extremely low fragility.

A shotting apparatus of the present invention can be prepared from alloys by any suitable method. For example, to prepare a shotting apparatus of the shape illustrated in FIG. 1, a sheet of the alloy can be welded into a cylinder to form a chamber that will contain molten material, followed by cutting a separate sheet of the alloy, welding it into a cone, and welding the cone to the cylinder, thereafter welding another sheet of the alloy into a smaller cylinder and welding the smaller cylinder to the cone to form an inlet, subsequently, if desired, welding a fitting onto the smaller cylinder to facilitate feeding of molten material into the apparatus, forming a circular plate of the alloy having orifices and protrusions through which the orifices pass, and welding the circular plate in place inside the first cylinder. The circular plate can be formed by any suitable process, such as molding, punching, stamping, cutting and drilling, or the like. Generally, the alloy components can be welded or joined by any process typically suitable for welding or joining steel. Preferably, electrodes, welding rods, and fluxes are cleaned to remove all machining lubricants, dirt, grease, oil, paint, temperature-indicating materials for temperatures over 700°F., marking crayon, or the like to avoid contamination of the alloy with elements such as sulfur or lead, which can embrittle the alloy. Further, the composition of the welding material preferably matches the composition of the alloy of the welded pieces as closely as possible. Any suitable welding technique can be employed. Examples of preferred welding techniques include shielded metal-arc welding, gas tungsten-arc welding, gas metal-arc welding, submerged arc welding, electron-beam welding, and the like. Further information concerning welding processes with high nickel content alloys is disclosed in, for example, *Welding Handbook*, 5th Edition, A. L. Phillips, Ed., Section 4, Chapter 67 ("Metals and their Weldability"), pages 67.3 to 67.45, American Welding Society, N. Y. (1966), the disclosure of which is totally incorporated herein by reference.

Shotting apparatuses of the present invention exhibit several advantages over known shotting apparatuses. For example, shotters typically employed to form shots of selenium or selenium alloys generally are of quartz, since most metals react readily with molten selenium. Quartz, however, can also contaminate selenium and selenium alloys, and when quartz is present in shots of selenium or selenium alloys employed in vacuum evaporation preparations of photoreceptors or imaging members, surface defects can result from evaporated quartz on the imaging member surface. With the shotters of the present invention, however contamination of the selenium or selenium alloy is reduced or eliminated, thereby reducing or eliminating surface defects attributable to shotter contamination on imaging members prepared from the selenium or selenium alloy. In addition, shotters of the present invention enable the formation of shots uniform in size for long periods of time. With known shotters, typically drops of a given size are produced for a short period of time, after which the drop size grows to an unacceptable level, necessitating interruption of the shotting process and cleaning of the shotter. While not being limited by theory, it is believed that drop size growth occurs because molten material passing through the orifices begins to stream, so that the material runs from the orifice from which it passed along the bottom surface of the plate to other orifices. When this streaming occurs, the drops formed grow in size. The shotters of the present invention, however, prevent streaming along the bottom surface of the shotter; the protrusions on the bottom surface through which the orifices pass prevent molten material passing through one orifice from streaming to join material passing through an adjacent orifice, since the orifices are separated by the protrusions (which comprise at least half of the length of the orifice) and since the molten material will not run uphill. Thus, shotting operations with the shotters of the present invention typically result in about 99 percent of the shots formed being within the uniform desired size specifications, even when the process continues for several days without interruption for cleaning of the shotter. Further, the silicon carbide or nickel alloy from which the shotters of the present invention are formulated enable the protrusions to be of the length specified herein; if the shotters were prepared from a more fragile material such as quartz, protrusions of this length could not be prepared because quartz generally cannot be cast into such an exact and complex shape unless large volumes are used to cover the mold making expenses. In addition, the protrusions on the bottom surface of the shotter plate, if prepared from a fragile material such as quartz, would, with increasing length of the protrusion, become more susceptible to cracking or chipping during fabrication. Molten glasses such as quartz tend to cool with many internal stresses, and later processing can remove the support for those stresses, resulting in cracking of the glass; protrusions of increasing length with respect to width, or of increasing relative "thinness", are increasingly susceptible to cracking. This disadvantage is eliminated with the shotter of the present invention, wherein the relatively long, thin protrusions of the shotter are of silicon carbide or of a metal alloy and thus of sufficient strength to prevent cracking and chipping.

The shotting apparatus of the present invention is useful for forming spherical shots. Generally, a shotting process with the apparatus of the present invention entails introducing a molten material into the shotting apparatus, allowing the molten material to pass through the orifices to form droplets, and cooling the droplets thus formed to a temperature at which the droplets are solid. In a preferred embodiment, the material from which shots are formed is selenium or an alloy of selenium, such as selenium-arsenic, selenium-tellurium, selenium-tellurium-arsenic, or the like, as well as selenium or selenium alloys containing dopants such as chlorine, other halogens, or the like. Typical selenium materials employed in this embodiment of the present invention either comprise pure selenium, alloys comprising selenium and arsenic, with arsenic present in an amount of up to about 40 percent by weight, alloys comprising selenium and tellurium, with tellurium present in an amount of up to about 25 percent by weight, and alloys comprising selenium, tellurium, and arsenic, with tellurium present in an amount of up to about 25 percent by weight and arsenic present in an amount of up to about 40 percent by weight. The alloy generally is formed by heating and mixing the alloy components at a temperature at which all components are molten, typically from about 200° C to about 350° C for a period of time sufficient to result in formation of the alloy, typically from about 1 to about 24 hours. The flow rate of molten alloy through the shotter varies, depending on the desired size of the resulting shots, the size of the plate, the size of the orifices in the plate, the composition and temperature of the alloy, and the like. For example, in a process employing a shotter with a plate having a diameter of 4 inches and 222 orifices 1.25 millimeters in diameter situated in a square pattern with the orifices 6 millimeters apart (measured horizontally or vertically, about 8.5 millimeters apart measured diagonally), with an alloy comprising from about 80 to about 92 percent by weight selenium and from about 8 to about 20 percent by weight tellurium at a temperature of about 300° C, the flow rate typically varies from about 0.25 to about 5 pounds per minute. Other process conditions can be employed; in each instance, the process conditions are determined empirically, depending on the material employed, the desired shot size, temperature, and the like.

Embodiments and modifications of the present invention other than the specific embodiments presented herein as examples may occur to those skilled in the art subsequent to a review of the information presented herein; these embodiments and modifications, as well as equivalents thereof, are also included within the scope of this invention.

What is claimed is:

1. A shotting apparatus which comprises a chamber for containing a molten material and a plate with a plurality of orifices through which the molten material can pass to form droplets, wherein the molten material in the chamber first contacts the top surface of the plate and wherein the bottom surface of the plate contains protrusions through which the orifices extend, the length of each protrusion being at least 50 percent of the total length of the orifice passing through the protrusion, wherein the apparatus is of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to about 1 percent by weight.

2. An apparatus according to claim 1 wherein the apparatus is of silicon carbide.

3. An apparatus according to claim 1 wherein the apparatus is of an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to about 1 percent by weight.

4. An apparatus according to claim 3 wherein the alloy comprises nickel in an amount of from about 55 to about 66 percent by weight, molybdenum in an amount of from about 14 to about 18 percent by weight, chromium in an amount of from about 14 to about 18 percent by weight, iron in an amount of from 0 to about 7 percent by weight, tungsten in an amount of from 0 to about 7 percent by weight, manganese in an amount of from 0 to about 1 percent by weight, and silicon in an amount of from 0 to about 1 percent by weight.

5. An apparatus according to claim 3 wherein the alloy comprises nickel in an amount of from about 57 to about 64 percent by weight, molybdenum in an amount of from about 15 to about 17 percent by weight, chromium in an amount of from about 15 to about 17 percent by weight, iron in an amount of from 0 to about 6 percent by weight, tungsten in an amount of from 0 to about 5 percent by weight, manganese in an amount of from 0 to about 1 percent by weight, and silicon in an amount of from 0 to about 1 percent by weight.

6. An apparatus according to claim 3 wherein the alloy comprises nickel in an amount of from about 57 to about 59 percent by weight, molybdenum in an amount of about 16 percent by weight, chromium in an amount of about 16 percent by weight, iron in an amount of from 0 to about 5 percent by weight, tungsten in an amount of about 4 percent by weight, manganese in an amount of from 0 to about 1 percent by weight, and silicon in an amount of from 0 to about 1 percent by weight.

7. A process of preparing solid spherical shots from a molten material which comprises:
 a. providing a shotting apparatus which comprises a chamber for containing a molten material and a plate with a plurality of orifices through which the molten material can pass to form droplets, wherein the molten material in the chamber first contacts the top surface of the plate and wherein the bottom surface of the plate contains protrusions through which the orifices extend, the length of each protrusion being at least 50 percent of the total length of the orifice passing through the protrusion, wherein the apparatus is of a material selected from the group consisting of silicon carbide and an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to about 1 percent by weight;
 b. introducing a molten material into the shotting apparatus;
 c. allowing the molten material to pass through the orifices to form droplets; and
 d. cooling the droplets thus formed to a temperature at which the droplets are solid.

8. A process according to claim 7 wherein the molten material is selected from the group consisting of selenium and alloys of selenium.

9. A process according to claim 8 wherein the alloys of selenium comprise selenium and an alloying component selected from the group consisting of tellurium, arsenic, and mixtures thereof.

10. A process according to claim 8 wherein the molten material also contains a halogen dopant.

11. A process according to claim 7 wherein the molten material comprises selenium in an amount of from about 35 to 100 percent by weight, tellurium in an amount of from 0 to about 25 percent by weight, and arsenic in an amount of from 0 to about 40 percent by weight.

12. A process according to claim 7 wherein the apparatus is of silicon carbide.

13. A process according to claim 7 wherein the apparatus is of an alloy comprising nickel in an amount of from about 50 to about 70 percent by weight, molybdenum in an amount of from about 11 to about 22 percent by weight, chromium in an amount of from about 11 to about 22 percent by weight, iron in an amount of from 0 to about 10 percent by weight, tungsten in an amount of from 0 to about 10 percent by weight, manganese in an amount of from 0 to about 1 percent by weight, and silicon in an amount of from 0 to bout 1 percent by weight.

14. A process according to claim 13 wherein the alloy comprises nickel in an amount of from about 55 to about 66 percent by weight, molybdenum in an amount of from about 14 to about 18 percent by weight, chromium in an amount of from about 14 to about 18 percent by weight, iron in an amount of from 0 to about 7 percent by weight, tungsten in an amount of from 0 to about 7 percent by weight, manganese in an amount of from 0 to about 1 percent by weight, and silicon in an amount of from 0 to about 1 percent by weight.

15. A process according to claim 13 wherein the alloy comprises nickel in an amount of from about 57 to about 64 percent by weight, molybdenum in an amount of from about 15 to about 17 percent by weight, chromium in an amount of from about 15 to about 17 percent by weight, iron in an amount of from 0 to about 6 percent by weight, tungsten in an amount of from 0 to about 5 percent by weight, manganese in an amount of from 0 to about 1 percent by weight, and silicon in an amount of from 0 to about 1 percent by weight.

16. A process according to claim 13 wherein the alloy comprises nickel in an amount of from about 57 to about 59 percent by weight, molybdenum in an amount of about 16 percent by weight, chromium in an amount of about 16 percent by weight, iron in an amount of from 0 to about 5 percent by weight, tungsten in an amount of about 4 percent by weight, manganese in an amount of from 0 to about 1 percent by weight, and silicon in an amount of from 0 to about 1 percent by weight.

17. A process according to claim 7 wherein the process is continuous for a period of at least 12 hours.

18. A process according to claim 7 wherein the process is continuous for a period of at least 2 days.

* * * * *